(12) United States Patent
Harju et al.

(10) Patent No.: US 8,543,111 B2
(45) Date of Patent: Sep. 24, 2013

(54) CONTROL OF CELL SEARCH PROCEDURE

(75) Inventors: Lauri Ilmari Harju, Turku (FI); Kaj Tapio Jansen, Salo (FI)

(73) Assignee: Renesas Mobile Corporation, Tokyo (JP)

( * ) Notice: Subject to any disclaimer, the term of this patent is extended or adjusted under 35 U.S.C. 154(b) by 218 days.

(21) Appl. No.: 13/083,905

(22) Filed: Apr. 11, 2011

(65) Prior Publication Data
US 2012/0258755 A1    Oct. 11, 2012

(51) Int. Cl.
*H04W 4/00* (2009.01)
(52) U.S. Cl.
USPC ................... 455/435.2; 455/161.3
(58) Field of Classification Search
USPC ............... 455/421, 432.1, 506, 443
See application file for complete search history.

(56) References Cited

U.S. PATENT DOCUMENTS

| 2004/0043769 | A1* | 3/2004 | Amerga et al. ............... 455/437 |
| 2005/0096053 | A1 | 5/2005 | Liu et al. |

FOREIGN PATENT DOCUMENTS

| DE | 19727867 | 12/1998 |
| EP | 0 812 119 A2 | 12/1997 |
| EP | 0812119 | 12/1997 |
| GB | 3205825 | 4/1997 |

OTHER PUBLICATIONS

3GPP TS 25.304, V8.8.0 (Dec. 2009), "$3^{rd}$ Generation Partnership Project; Technical Specification Group Radio Access Network; User Equipment (UE) procedures in idle mode and procedures for cell reselection in connected mode (Release 8)", 49 pgs.

* cited by examiner

*Primary Examiner* — Tu X Nguyen
(74) *Attorney, Agent, or Firm* — Stanton IP Law

(57) ABSTRACT

A method, an apparatus and a computer program product for controlling cell search procedure, including a user equipment determining a change of position in relation to a serving cell; determining the quality of signal received from the serving cell; and stopping the cell search procedure if the change of position is smaller than a first value and the loss of signal quality is lower than a second value.

20 Claims, 4 Drawing Sheets

CONTROL OF CELL SEARCH PROCEDURE

FIELD OF THE INVENTION

The invention relates to mobile communication networks. More specifically, the invention relates to controlling cell search procedure at a user equipment.

BACKGROUND OF THE INVENTION

Power consumption is one of the key factors in mobile/wireless communications. A wireless user equipment consumes energy also in idle mode comprising tasks of cell selection and reselection.

In WCDMA technology three codes are provided for cell search and synchronization: primary synchronization code PSC, secondary synchronization code SSC and scrambling code SCRC. The cell search procedure searches new cells and synchronization finds the timing of the cell. The cell search procedure searches new correlation peaks for PSC, the highest group correlation for SSC and finally finds the SCRC of the cell. The PSC provides slot timing and SSC provides frame timing. If the cell is not already in the neighbor list it is a new cell.

In this method the user equipment is searching new cells even when no new cells cannot be found and thus uses the RF part when it is not needed. The RF part is usually the biggest energy consumer in the user equipment; therefore, its use should be minimized.

3GPP, 3rd Generation Partnership Project, develops specifications for third generation mobile phone systems, and also from Release 8 (Rel-8) the next generation specifications often referred to as LTE, Long Term Evolution. The document 3GPP 25.304 v8.8.0, section 5.2.6, discloses Cell Reselection Evaluation Process and methods for limiting cell search procedure. Current WCDMA technology performs the cell search every 5.12 seconds in idle mode. In WCDMA the S-rules are limiting the cell search procedure, where the network delivers S-rules to the user equipment. The network may also signal a limit value for the user equipment.

EP812119 discloses a method in which after making RSSI and possibly also Bit Error Rate/Word Error Rate (BER/WER) measurements the mobile station monitors the rate of change of the received signal strength indication RSSI. If the rate of change is small and remains so, the mobile station is assumed to be in a stationary state. When in the stationary state the mobile station inhibits making neighbor channel measurements for digital control channel DCCH reselection.

PURPOSE OF THE INVENTION

The purpose of the invention is to present a new method, an apparatus and a computer program product for controlling the cell search procedure of the user equipment to reduce the energy consumption.

SUMMARY

The invention discloses a method for controlling the cell search procedure. An apparatus for wireless communication determines a change of position in relation to a serving cell and the quality of signal received from the serving cell. The cell search procedure is caused to stop if the change of position is smaller than a first value and the loss of signal quality is lower than a second value. Stopping the cell search procedure affects only to a single cell search cycle at a time. The effect of stopping is that remaining functions relating to a single cell search cycle are not executed.

In one embodiment the change of position is determined from serving cell RSCP value change. RSCP, Received Signal Code Power as defined by the 3GPP, denotes the power measured by a receiver on a physical communication channel. The inventors have discovered by field and laboratory tests that the serving cell RSCP value change is a very good indicator of user equipment's movement. In one embodiment the RSCP value change is determined by comparing the latest measured RSCP value to the RSCP value measured during the latest cell search procedure.

In one embodiment the quality of a signal is determined from received CPICH Ec/Io level. CPICH Ec/Io, Common Pilot Channel Energy of Chip (Ec) divided by Total Power (Io) as defined by the 3GPP, denotes the received signal quality.

In one embodiment the cell search procedure is caused to stop when new cells have not been found in a predefined number of consecutive searches. In one embodiment the cell search procedure is completed after a predefined number of stopped cell search procedures. In one embodiment the apparatus for wireless communication is configured to operate as part of a user equipment. Examples of a user equipment are a mobile phone, a mobile computing device such as PDA, a laptop computer, an USE stick—basically any mobile device with wireless connectivity to a communication network.

According to one aspect of the present invention the invention discloses an apparatus for wireless communication, comprising at least one processor configured to determine a change of position in relation to a serving cell; determine the quality of signal received from the serving cell; and cause the cell search procedure to stop if the change of position is smaller than a first value and the loss of signal quality is lower than a second value.

In one embodiment the processor is configured to determine the change of position from serving cell RSCP value change. In one embodiment the processor is configured to determine the RSCP value change by comparing the latest measured RSCP value to the RSCP value measured during the latest cell search procedure. In one embodiment the processor is configured to determine the quality of a signal received from CPICH Ec/Io value. In one embodiment the processor is configured to cause the cell search procedure to stop when new cells have not been found in a predefined number of consecutive searches. In one embodiment the processor is configured to complete the cell search procedure after a predefined number of stopped cell search procedures.

According to one aspect of the present invention the invention discloses a computer program product comprising a computer-readable medium bearing computer program code embodied therein for use with a computer, the computer program code comprising determining a change of position in relation to a serving cell; determining the quality of signal received from the serving cell; and stopping the cell search procedure if the change of position is smaller than a first value and the loss of signal quality is lower than a second value.

The invention decreases the user equipment's energy consumption especially in the radio signal processing parts of the user equipment. The solution ensures that if the signal characteristics change rapidly, the power saving idle mode does not create additional lag to the user equipment. The invention does not consume energy for locating the user equipment as compared to more comprehensive methods such as GPS. As the invention affects only the functionality residing within, or being attached to the user equipment, it does not require any change to a mobile network to which it is connected. Network elements complying with the standards do not need to be modified in order to achieve the effects of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
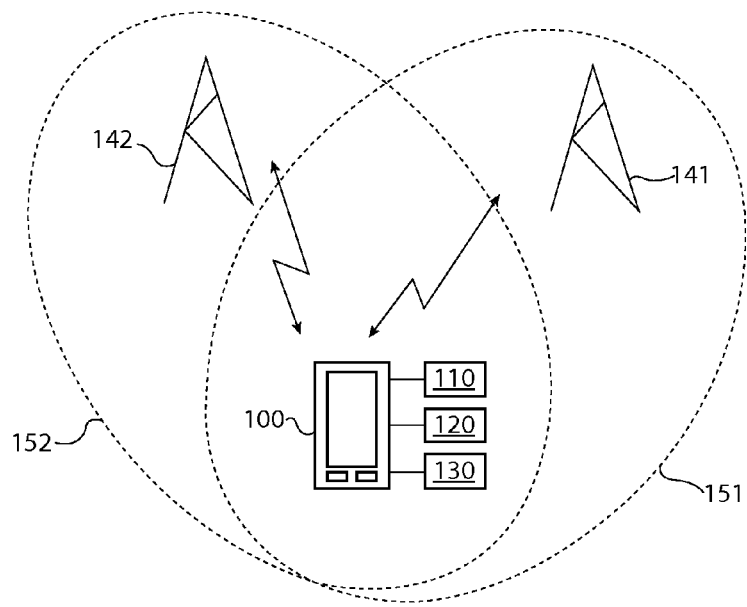
FIG. 1 is a block diagram of an example embodiment of the present invention illustrating the user equipment and network elements.

FIG. 1 is a block diagram illustrating an apparatus 100 according to an embodiment connected to a mobile communication network. The apparatus 100 comprises at least one controller 110, such as a processor, a memory 120 and a communication interface 130. In one embodiment the apparatus is a computer chip. Stored in the memory 120 are computer instructions which are adapted to be executed on the processor 110. The communication interface 130 is adapted to receive and send information to and from the processor 110. The apparatus 100 is commonly referred as user equipment. In one embodiment the user equipment 100 is a wireless modem.

The user equipment 100 is adapted to be part of a cellular radio access network such as an E-UTRAN or a UMTS Terrestrial Radio Access Network (UTRAN), applying WCDMA technology. Such networks are often also referred to as 3G, UMTS, 4G or LTE. In one embodiment the network is a GSM-Edge Radio Access Network (GERAN). Such systems comprise a number of base stations 141, 142 each handling a cell 151, 152. The serving cell is the cell to which the user equipment 100 is connected. In this example the user equipment 100 is connected to a serving cell 151 and the base station 141. During the cell search procedure the user equipment 100 receives information and measurement data also from the neighboring cell 152 and the neighboring base station 142. In the idle mode the user equipment 100 optimizes the connection for a camping cell 151 and checks for better candidates for a new camping cell. The user equipment 100 executes periodically cell search, cell selection and random access procedures. Cell search and selection is an essential procedure and the basis of every interaction between a terminal and a network. The user equipment 100 executes a cell reselection also in idle mode.

The invention is based on the idea that new cells will not appear to the user equipment 100 searching for cells if the user equipment 100 is not moving and the environment does not affect the situation significantly. In one embodiment the operation relates only to intra-frequency (on-frequency) during the idle mode and reduces the search for new neighboring cells. In one embodiment the operation relates to discontinuous reception DRX modes such as idle, ura_pch or cell_pch.

According to an embodiment of the invention the values of RSCP variation and CPICH Ec/Io level are used to indicate whether the cell search is needed. The algorithm checks the latest RSCP value change and serving cell CPICH Ec/Io level when new cells are not found in a number of consecutive searches. If the RSCP change and CPICH Ec/Io level are in predefined limits the cell search procedure is stopped. By stopping the cell search procedure several power consuming functions are not executed or the cell search procedure is not called. Examples of such functions are PSC, SSC and SCRC and all related procedures such as ordering PSC correlation peaks or threshold checks. PSC and SSC correlations are known to be among the most energy consuming functions within the radio interface.

In the beginning of a DRX cycle the RSCP value change and CPICH Ec/Io are measured. If both values are within predefined limits the algorithm waits for the next cell search cycle. If either value is beyond a limit value, a full cell search procedure is completed. A DRX cycle is denoted as the individual time interval between monitoring Paging Occasion for the user equipment 100 or a sleeping cycle of the user equipment 100. The needed measurements are made in the beginning of every cycle. Using only RSCP variation and CPICH Ec/Io level minimizes the correlations needed to shut down unnecessary functions and thus saves the processor computing power and energy.

Short term RSCP variation is caused by reflection and diffraction which can be called also as multipaths of the signal. Multipaths behave according to superposition principle meaning that some of the signals are on superposition and amplify each other, some are attenuating each other totally and some are behaving as between these two extremes. The distance between the base station 142 and user equipment 100 is causing mainly the level of the attenuation. The attenuation caused by line of sight distance is called as free-space path loss.

Figure 2A:
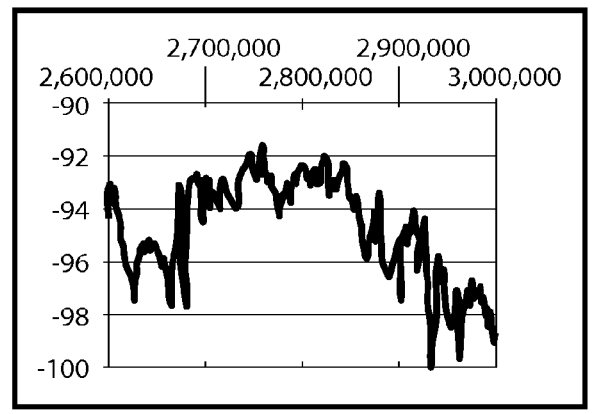
FIG. 2a is a chart diagram illustrating an example of RSCP variation.
Figure 2C:
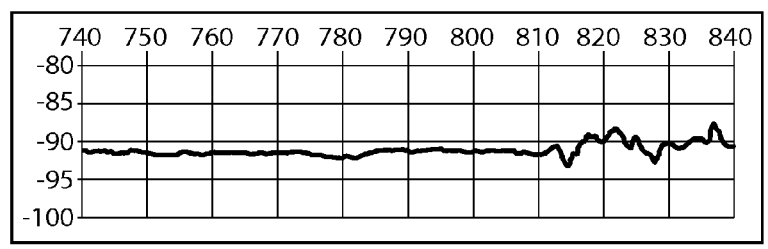
FIG. 2b is a chart diagram illustrating a second example of RSCP variation.

An example of typical RSCP value behavior in a long time period is illustrated in FIG. 2a. The RSCP level may change significantly in a long measurement period but it is not necessarily a sign of a moving user equipment 100. It is reasonable to check only if the latest change has been significant. This will allow normal variation to the signal but retain the ability for detecting the movement of the user equipment 100. A first value is set to define the limit for the RSCP value change. In one embodiment the RSCP value change is evaluated over a longer time period by comparing the latest measured RSCP value to the RSCP value measured during the latest cell search procedure. This enables the user equipment 100 to detect slower movement and transitions. The first value may be adjusted accordingly to comply with normal variation of the RSCP value.

Figure 2B:
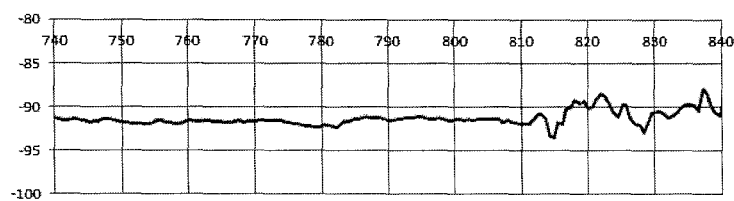

FIG. 2b illustrates a situation where the user equipment 100 is picked up by hand and the value change is very rapid. A benefit for this solution is that the user equipment 100 has the ability to react to quick transitions even in the idle mode. The user equipment 100 is not moved until 811 seconds mark. A short movement results to few dBs variation in very short time. The change of position in relation to the serving cell 151 may be a small one; the solution may detect user equipment's rotation in the same location. The invention does not achieve energy saving by waking up less often, but by reducing the time the user equipment 100 is awake. Measurements are made as frequently as in the traditional idle mode.

The serving cell 151 should have high signal quality; therefore, a second value: lowest serving cell CPICH Ec/Io, is set for the algorithm. The high signal quality is needed for paging reception if a call is received by the user equipment.

In one embodiment a forced or guaranteed cell search rate is used for safety reasons as the energy saving will be significant even if cell search is performed for example once in 40.96 seconds. In other words the cell search is performed after a predetermined number of search periods have passed without doing any searches. Exemplary search period is the one defined in WCDMA standard, where a cell search is run every 5.12 seconds. The used example represents case where the search is run after 8 periods of 5.12 seconds has been passed. In other, equally applicable technologies the period can be chosen to be any other time period.

RSCP, Received Signal Code Power, denotes the power measured by a receiver on a particular physical communication channel. It is used as an indication of signal strength, as a handover criterion, in downlink power control, and to calculate path loss. In CDMA systems, a physical channel corresponds to a particular spreading code. In principle the RSCP is not designed for indicating distance, but inventors have noted that variations in this parameter have characteristics which are a good indication of user equipment mobility/movement and also distance. The smaller RSCP value indicates longer distance, whereas a larger value indicates that the user equipment 100 resides closer to the base station.

CPICH Ec/Io, Common Pilot Channel Energy of Chip (Ec) divided by Total Power (Io), indicates the quality of the signal received from the serving cell 151 and is a key indicator for deciding whether there is a need to search for a better base station. The CPICH Ec/Io value can be poor if the neighboring base station 142 is very powerful; it may be closer than the serving cell 151 or it may have more transmission power in use. The neighboring base station 142 may be powerful without any ongoing data transfer, which makes it a favorable candidate for handover. Alternatively the base station 142 may have significant data transfer going on; if the CPICH Ec/Io value is lower than the current serving cell 151 the base station 142 is not a preferred candidate for handover. If the CPICH Ec/Io is very low, dropping the serving cell signal is more likely and the user equipment 100 should keep searching for a better base station.

Figure 3:
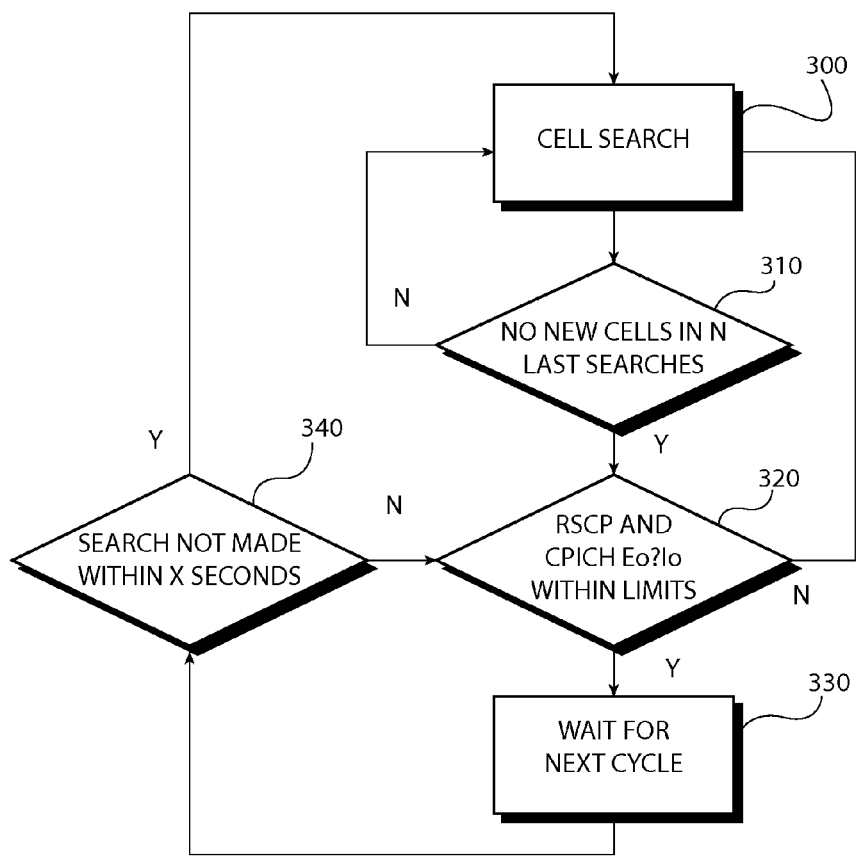
FIG. 3 is a block diagram illustrating the functionality of the invention.

The invention is explained also in a flow chart of FIG. 3. Block 300 starts a new cell search procedure. The first checkpoint is whether the user equipment has found any new cells during a predetermined number of last searches, block 310. The predetermined number is denoted as N. If the user equipment has been stationary for a longer period, no new cells have been found and the method proceeds to block 320. Otherwise the method returns to block 300 to execute a full cell search procedure.

In block 320 the method checks if RSCP value change and CPICH Ec/Io are within predetermined limits, i.e. whether the user equipment is moving in relation to the serving cell 151 and the received signal from the serving cell 151 is adequate. If not, the method returns to block 300 for full cell search procedure; otherwise, the method proceeds to block 330 to wait for next DRX cycle. From block 330 the method proceeds to check whether the cell search procedure has been executed within a predetermined time, block 340. This ensures that the cell search procedure is completed periodically even when the user equipment is stationary and the method proceeds to cell search procedure in block 300. If the period for a forced cell search is not over, the method loops back to block 320 for checking RSCP and CPICH Ec/Io and waiting for next cycle in block 330.

Embodiments of the present invention may be implemented in software, hardware, application logic or a combination of software, hardware and application logic. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

If desired, the different functions discussed herein may be performed in a different order and/or concurrently with each other.

Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for controlling cell search procedure by an apparatus for wireless communication, the method comprising:
    determining a change of position in relation to a serving cell;
    determining quality of a signal received from the serving cell; and causing the cell search procedure to stop if the change of position is smaller than a first value and the determined quality is lower than a second value.

2. The method according to claim 1, wherein the change of position is determined from a value change of serving cell received signal code power (RSCP).

3. The method according to claim 2, wherein the value change in serving cell RSCP is determined by comparing a RSCP value measured during a current cell search procedure to a RSCP value measured during a latest cell search procedure.

4. The method according to claim 1, wherein determining the quality comprises determining pilot chip energy to interference power spectral density (Ec/Io) of a signal received a common pilot channel (CPICH).

5. The method according to claim 1, wherein the cell search procedure is caused to stop when new cells have not been found in a predefined number of consecutive searches.

6. The method according to claim 1, the method further comprising completing the cell search procedure after a predefined number of stopped cell search procedures.

7. The method according to claim 1, wherein the apparatus for wireless communication is configured to operate as part of a user equipment.

8. An apparatus for wireless communication, comprising at least one processor and a memory storing computer instructions executable by the at least one processor, wherein the memory with the computer instructions and the processor are configured to cause the apparatus to at least:
determine a change of position in relation to a serving cell;
determine quality of a signal received from the serving cell; and
cause a cell search procedure to stop if the change of position is smaller than a first value and the determined quality is lower than a second value.

9. The apparatus according to claim 8, wherein the memory with the computer instructions and the processor are configured to cause the apparatus to determine the change of position from a value change of serving cell received signal code power (RSCP).

10. The apparatus according to claim 9, wherein the value change in serving cell RSCP is determined by comparing a RSCP value measured during a current cell search procedure to a RSCP value measured during a latest cell search procedure.

11. The apparatus according to claim 8, wherein the determined quality of the signal comprises pilot chip energy to interference power spectral density (Ec/Io) of the signal received from a common pilot channel (CPICH).

12. The apparatus according to claim 8, wherein the cell search procedure is caused to stop when new cells have not been found in a predefined number of consecutive searches.

13. The apparatus according to claim 8, wherein the memory with the computer instructions and the processor are configured to cause the apparatus to complete the cell search procedure after a predefined number of stopped cell search procedures.

14. The apparatus according to claim 8, wherein the apparatus is configured to operate as part of a user equipment.

15. A computer-readable memory tangibly storing computer program code embodied therein which is executable by a computer, the computer program code comprising:
code for determining a change of position in relation to a serving cell;
code for determining quality of a signal received from the serving cell; and
code for causing a cell search procedure to stop if the change of position is smaller than a first value and the determined quality is lower than a second value.

16. The computer-readable memory according to claim 15, wherein the change of position is determined from a change in value of serving cell received signal code power (RSCP) .RSCP value change.

17. The computer-readable memory according to claim 16, wherein the change in value of serving cell RSCP is determined by comparing a RSCP value measured during a current cell search procedure to a RSCP value measured during a latest cell search procedure.

18. The computer-readable memory according to claim 15, wherein determining the quality comprises determining pilot chip energy to interference power spectral density (Ec/Io) of a signal received from a common pilot channel (CPICH).

19. The computer-readable memory according to claim 15, wherein the cell search procedure is caused to stop when new cells have not been found in a predefined number of consecutive searches.

20. The computer-readable memory according to claim 15, further comprising code for completing the cell search procedure after a predefined number of stopped cell search procedures.

* * * * *

UNITED STATES PATENT AND TRADEMARK OFFICE
CERTIFICATE OF CORRECTION

PATENT NO.         : 8,543,111 B2                           Page 1 of 1
APPLICATION NO.    : 13/083905
DATED              : September 24, 2013
INVENTOR(S)        : Lauri Ilmari Harju et al.

It is certified that error appears in the above-identified patent and that said Letters Patent is hereby corrected as shown below:

In the Claims

Column 8, line 28, the terms "RSCP value change" after the "." should be deleted.

Signed and Sealed this
Fifteenth Day of April, 2014

Michelle K. Lee
*Deputy Director of the United States Patent and Trademark Office*